(12) United States Patent
Kikinis

(10) Patent No.: US 6,377,368 B2
(45) Date of Patent: Apr. 23, 2002

(54) METHOD AND APPARATUS FOR CREATING A WHITE-LIGHT INTERFERENCE HOLOGRAM FROM PC INPUT PHOTOGRAPHIC DATA

(75) Inventor: Dan Kikinis, Saratoga, CA (US)

(73) Assignee: Lextron Systems, Inc., Saratoga, CA (US)

(*) Notice: Subject to any disclaimer, the term of this patent is extended or adjusted under 35 U.S.C. 154(b) by 0 days.

(21) Appl. No.: 09/893,088

(22) Filed: Jun. 26, 2001

Related U.S. Application Data

(62) Division of application No. 09/173,904, filed on Oct. 16, 1998, now Pat. No. 6,292,277.

(51) Int. Cl.[7] ............................. G03H 1/08; G06T 17/00
(52) U.S. Cl. ................................................ 359/9; 359/23
(58) Field of Search .............................. 359/9, 1, 2, 23

(56) References Cited

U.S. PATENT DOCUMENTS 4,109,996 A * 8/1978 Ersoy ............................. 359/9
5,103,324 A * 4/1992 Brandstetter ................... 359/9
5,668,648 A * 9/1997 Saito et al. ..................... 359/9

* cited by examiner

Primary Examiner—Jon Henry
(74) Attorney, Agent, or Firm—Donald R. Boys; Central Coast Patent Agency, Inc.

(57) ABSTRACT

A system for producing a white-light interference hologram includes a camera adapted for recording a first and a second bitmap image of a scene from separate vantage points, and the separation distance of the vantage points, a computing engine adapted to compute three-dimensional x, y, and z characteristics of an interference hologram topology for the scene from the bitmap image and separation data, wherein x and y are two dimensional locations of bits in a bitmap of the topology and z is a depth dimension for each x,y bit, and a printer adapted to print in color the x,y bitmap, and to create the depth dimension z at each x,y bit location, providing thereby a three-dimensional interference hologram topology for the scene. In a preferred embodiment the depth dimension is created by electrophoresis, using a medium having an electrophoretic gel layer, with the ink applied to the gel in a bit-mapped pattern being ionic in nature, and capable of being migrated in the gel layer by electrophoresis. In other embodiments the third dimension is provided by using magnetic ink and migrating the bits using controlled magnetic fields.

1 Claim, 7 Drawing Sheets

METHOD AND APPARATUS FOR CREATING A WHITE-LIGHT INTERFERENCE HOLOGRAM FROM PC INPUT PHOTOGRAPHIC DATA

CROSS-REFERENCE TO RELATED DOCUMENTS

The present application is a divisional of copending application Ser. No. 09/173,904, filed Oct. 16, 1998 now U.S. Pat. No. 6,292,277 which is incorporated herein in its entirety by reference.

FIELD OF THE INVENTION

The present invention is in the field of digital photography and printing, and pertains more particularly to a method and apparatus for digital photography, and use of the photographic data for creating interference holograms using printing apparatus.

BACKGROUND OF THE INVENTION

Rendering 3-dimensional (3-D) graphics on a 2-dimensional plane such as a computer monitor screen has been an emerging technology marked with many advances. For example, with the use of special 3-D cards and adapters, a 3-dimensional object may be created from dimensional information provided of the form of input to a computer system running appropriate software. After calculating input data, the computer system renders a simulated 3-D image on its 2-dimensional screen. A viewer may use special goggles to view 3-D images on a computer screen or other two-dimensional apparatus such as on a movie screen.

In another aspect of the art, hologram techniques are also used to produce 3-D effects on plastic cards and the like. Such holograms are familiar to many as embossed on such as credit cards. This sort of hologram is called a white-light-interference hologram, and is created through a reflective surface having a relatively complicated topology that reflects white light in a manner to produce interference patterns that the human eye sees as a 3-D image.

This technique is commonly practiced with the use of a stamping operation onto plastic surfaces, such as with holographic baseball cards and the like.

Unfortunately, 3-D image media such as white light holograms cannot be printed by conventional computer techniques or easily acquired. What is clearly needed is a method and apparatus that will allow 3-dimensional renderings of real photographed objects to be printed much the same as two-dimensional images are printed, using such as ink-jet technology. In the descriptions which follow a new collection and rendering technology is taught in enabling detail wherein, with the use of a computer station, an image may be captured with a digital camera and rendered by a special printer as white light interference hologram.

SUMMARY OF THE INVENTION

In a preferred embodiment of the present invention a system for producing a white-light interference hologram is provided, comprising a camera adapted for recording a first and a second bitmap image of a scene from separate vantage points, and the separation distance of the vantage points; a computing engine adapted to compute three-dimensional x, y, and z characteristics of an interference hologram topology for the scene from the bitmap image and separation data, wherein x and y are two dimensional locations of bits in a bitmap of the topology and z is a depth dimension for each x,y bit; and a printer adapted to print in color the x,y bitmap, and to create the depth dimension z at each x,y bit location, providing thereby a three-dimensional interference hologram topology for the scene.

In one embodiment of the system the printer prints the x,y bitmap for the interference hologram using ionic ink on one surface of a medium comprising an electrophoretic gel layer, and provides the z dimension for the topology by elecrophoresis of the ink into the gel of the medium. In another embodiment the printer prints the x,y bitmap for the interference hologram using magnetic ink on one surface of a medium comprising a porous layer, and provides the z dimension for the topology by magnetic migration of the of the ink into the gel of the medium.

In another aspect of the invention a topology printer for producing a white-light interference hologram is provided, comprising a print head adapted for depositing ionic ink in a bit-map pattern on a surface of a medium comprising an electrophoretic gel layer; and an electrode head disposed opposite the print head and spaced apart from the print head, creating a passage for the medium. The electrode head creates an electric field for each bit in the bit map pattern, the field controlled in magnitude and duration to migrate the ionic ink of each bit into the electrophoretic gel by a z-dimension, creating thereby the topology for the white-light interference hologram. In a preferred embodiment print head is adapted to deposit plural bits simultaneously in a fixed pattern, and the electrode head comprises a separate electrode for each bit, with the electrodes arranged in the same pattern as the fixed pattern of simultaneously-deposited bits. Also in an embodiment one or both of the gel and the ink are curable by radiated energy, and the printer further comprises a radiation head disposed to apply curing radiation immediately following migration of ink bits into the gel layer.

Another printer for producing a white-light interference hologram is provided, comprising a print head adapted for depositing magnetic ink in a bit-map pattern on a surface of a medium comprising a porous layer; and a magnetic head disposed opposite the print head and spaced apart from the print head, creating a passage for the medium. In this embodiment the magnetic head creates a magnetic field for each bit in the bit map pattern, the field controlled in magnitude and duration to migrate the magnetic ink of each bit into the porous layer by a z-dimension, creating thereby the topology for the white-light interference hologram.

In yet another embodiment a topology printer for producing a white-light interference hologram is provided, comprising a laser head adapted for producing openings in a print medium, the openings provided in a bit-map array according to two-dimensional x,y data for a white-light interference hologram, and each to a depth according to a z-dimension for each bit in the two-dimensional array; and a print head adapted for depositing ink over the openings provided by a the laser head, in a manner that the ink for each bit is migrated by capillary action into each opening in the bit map array, creating thereby the white-light interference hologram.

In other aspects several methods are taught for practicing the invention using the apparatus described and taught.

In yet another embodiment a digital camera for capturing information to create a white-light interference hologram of a scene is provided, comprising a first charge-coupled device (CCD) array for capturing a first bit-map file of the scene from a first vantage point; and a second CCD array spaced apart by a first spacing from the first CCD array, the second CCD array for capturing a second bit-map file of the scene from a second vantage point. The first spacing is adjustable and measurable by the camera to be stored with the first and second bit-mapped files.

Finally a medium for producing a white-light interference hologram is taught, the medium comprising a porous transmissive layer for accepting ink applied in a bit-mapped pattern; and a transparent electrophoretic gel layer adjacent the transmissive layer for providing a depth field for ink applied in the bit-mapped pattern.

With the apparatus and methods taught, interference holograms can, for the first time, be created by taking a picture with a digital camera, and printing the hologram from the captured picture data, transformed by algorithm, the printing being done on an apparatus much like an ink-jet printer. These and other aspects of the invention are taught below in enabling detail.

BRIEF DESCRIPTION OF THE DRAWING FIGURES

DESCRIPTION OF THE PREFERRED EMBODIMENTS

According to an embodiment of the present invention, a unique input/output 3-D system is provided for the purpose of capturing image data and enabling printing of a digital photograph with 3-D characteristics on an innovative medium similar to paper, using an innovative ink-jet topological printing apparatus and technique. The present invention, according to various innovative embodiments is described in enabling detail below.

Figure 1:
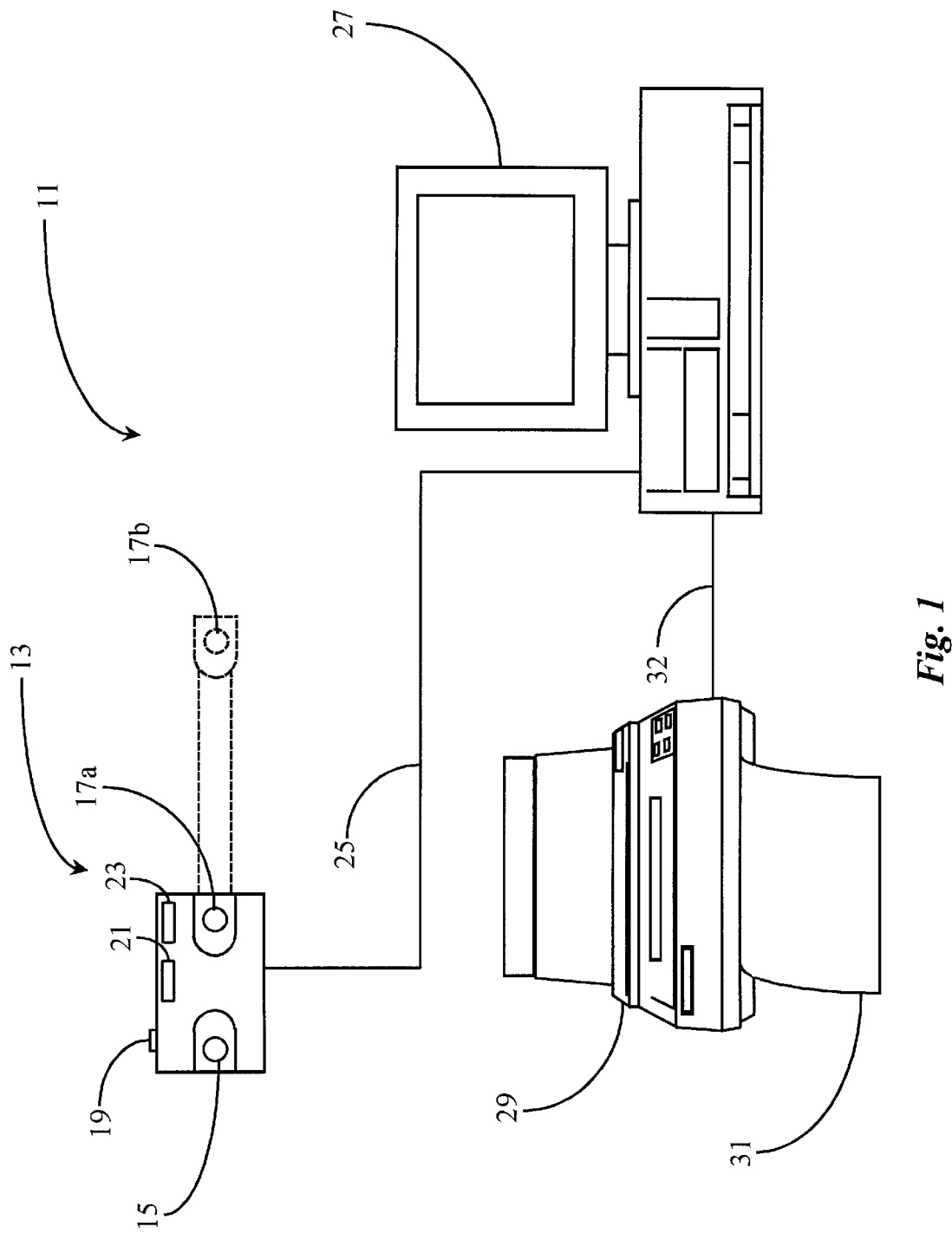
FIG. 1 is a block diagram illustrating a 3-D input/output system according to an embodiment of the present invention.

FIG. 1 is a block diagram illustrating a 3-D input/output system 11 according to an embodiment of the present invention. System 11 is provided and adapted to take image input from a special 3-D digital camera 13, to transform the input, using a personal computer (PC) to a data stream having x, y, and z information for an interference topology, and to print the 3-D interference topology via an innovative topological printer 29 on a special paper-like medium 31.

3-D camera 13 in a preferred embodiment is a digital stereo-camera that is adapted to take digital pictures of a subject from two different vantage points. This is accomplished via two charge-coupled devices (CCD) arrays, CCD array 15 and CCD array 17. According to an embodiment of the present invention, at least one of CCD arrays 15 and 17 are adjustable such that their distance from each other may be increased or decreased. Such adjustment capability is illustrated by showing two positions for array 17, labeled 17a and 17b. In this way, a wider vantage-base may be exploited during photography, thereby supplying more useful dimensional data for use in rendering an ultimate 3-D image for printing.

3-D camera 13 has a one-click shoot button 19, among other possible options including an automatic focus button 21 and a zoom button 23. It will be apparent to one with skill in the art that other options known in the art of digital cameras may also be present such as auto flash, annotation insert capability, date and time-stamping capability, audio annotation, autofocus, series shoot, sound annotation and so on.

CCD arrays 15 and 17 simultaneously collect data from a photographed subject from two distinctly separate vantage points during one shutter event. The data collected by each CCD array includes RGB data for each pixel in a pre-defined array for each vantage point. CCD array 17 will record different values for subject-pixels in a photographed object than will CCD array 15 by virtue of its separate vantage point. Along with RGB values, the distance between the two CCD arrays at the time of taking the double-array photograph is also recorded and stored with the image data files.

The input data, as described above, is rendered typically in two separate data files. One file for CCD array 15, and one file for CCD array 17. The data files are stored in a suitable memory such as on an optionally removable memory card that may be plugged into a PC slot adapted to receive it. In this particular embodiment, however, an input cable 25 is used to link camera 13 to PC 27 for downloading data. Also, data may be stored in compressed formats, or in simple file formats.

PC 27 is provided and adapted, principally by virtue of software, for receiving the input from camera 13 and transforming the data into a topological data stream that may be understood by a printing unit and software such as printer 29 (software not illustrated). In some embodiments, input image data may be displayed on a PC monitor associated with PC 27, however, this is not required to practice the present invention. During the viewing on the PC, both 2D views with manipulator for changing of virtual vantage point and 3D views using goggles etc. may be used. The combined and processed output is sent via a printer cable 32 to printer 29 for printing a white-light interference hologram.

An algorithm engine (not shown) is provided as part of the system software installed on PC 27, and is adapted for analyzing the two-dimensional renderings from both CCD files and, by executing known algorithms, creating a 3-D field graph. That is then converted using known algorithms into a multiview, 3D whitelight holographic interference pattern consisting of 2-axes in a plane, arid a $3^{rd}$ axis for the relief. The number of views (typically 30–100) will provide the aspect of the object from each vantage point angle to the paper surface. This data stream is prepared providing two-dimensional information for a printer 29 to apply ink to a surface of medium 31 for two dimensions of an interference hologram topology, and including the third "depth dimension" or "Z axis dimension" for each calculated pixel. The mathematics for taking such information and rendering the 3-D requirements for an interference hologram is well-known in the art, and therefore not taught herein, as any worker with ordinary skill has access to these mathematical techniques. With this information an accurate topology may be printed on a special medium 31 and printer 29 that are both uniquely adapted for the purpose. Further detail regarding the unique printing method and apparatus is taught below.

Figure 2:
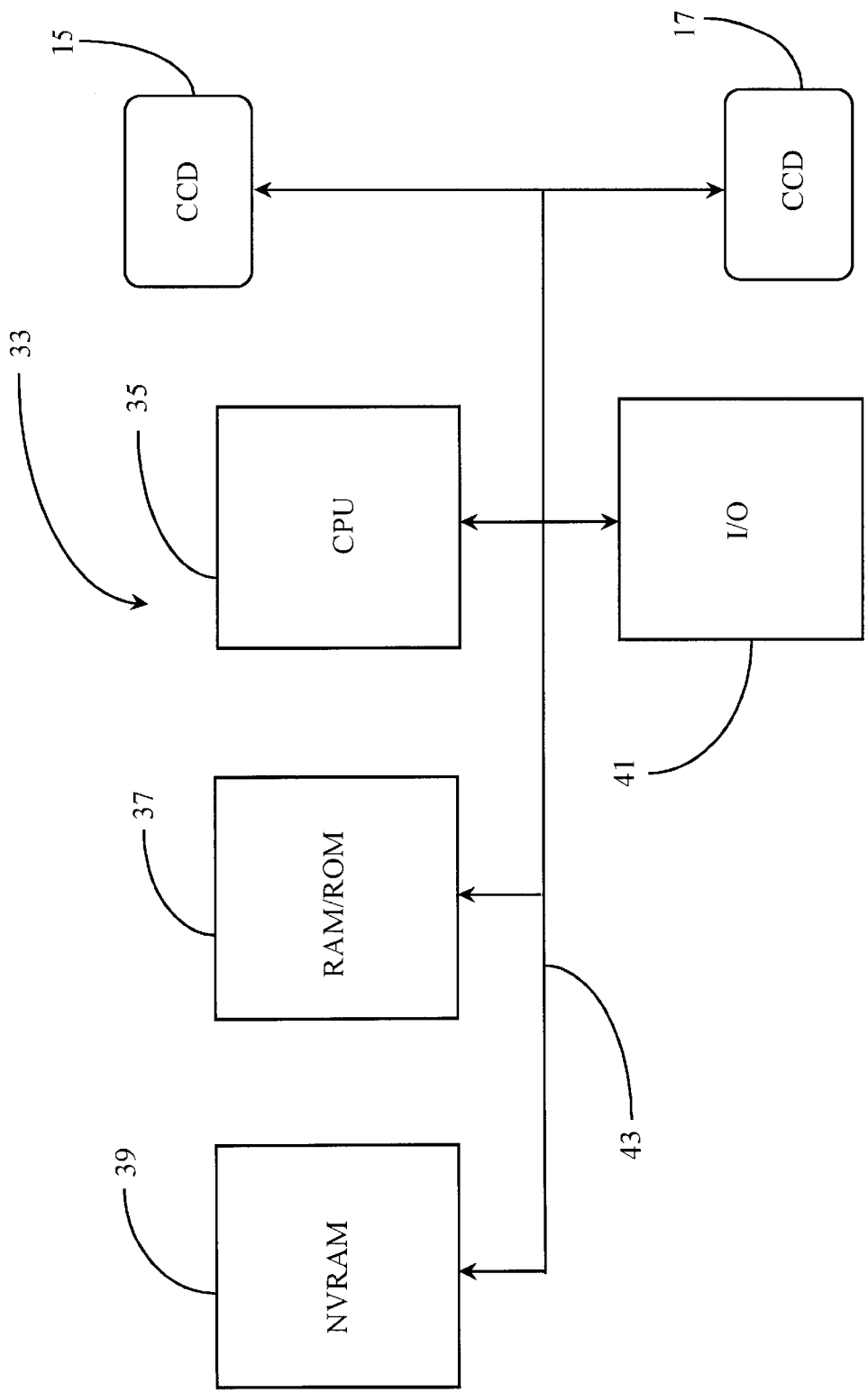
FIG. 2 is a block diagram illustrating camera circuitry contained in the camera of FIG. 1 according to an embodiment of the present invention.

FIG. 2 is a block diagram illustrating camera circuitry of camera 13 of FIG. 1 according to an embodiment of the present invention. Circuitry 33 has a central processing unit (CPU) 35, typically a microcontroller, which is responsible for managing functions that are required by camera 13 of FIG. 1 and providing routine boot instructions as is typical in the art. Circuitry 33 further comprises a non-volatile random-access-memory (NVRAM) for storing digital information so such information may be retained when the camera is off, and a random-access-memory/read-only-memory (RAM/ROM) for storing digital information that is temporary (RAM), and for storing boot and system information (ROM). It should be noted here that the memory types provided and discussed with reference to NVRAM 39 and RAM/ROM 37 may be provided in virtually any mix so long as there is sufficient memory of the appropriate type for executing and supporting the intended functions and features of camera 13. Moreover, certain portions of memory described above may be of a removable form such as PC cards, flash cards, and so on.

An input/output (I/O) port controls camera input such as functions activated via buttons 21, 19, and 23 of camera 13 of FIG. 1, as well as an output for uploading files to a PC such as PC 27 of FIG. 1. Memory modules 39 and 37, CPU 35 and I/O 41 are connected to each other via a bus structure 43. Similarly, CCD arrays 15 and 17a, and micro-controller 45 are connected to bus structure 43. These elements, though described in a general way, are familiar to the skilled artisan.

The innovative aspect of camera 13 as described above involves the separate configuration of CCD arrays that may be adjustable in relative position and that are used for providing different views of a single subject being photographed. Each CCD array typically has a Cartesian array of photo-elements (not shown) for each color red, green, and blue in the RGB system.

It will be apparent to one with skill in the art that a digital camera such as camera 13 of FIG. 1 may comprise varying circuitry other than that illustrated herein without departing from the spirit and scope of the present invention. Circuitry 33 as illustrated is meant to be exemplary only in describing basic circuitry of a digital camera. An innovative aspect of the camera is the adjustable physical separation of the CCD arrays and their ability to render two separate files of a same image at one shutter event, including an ability to quantify the separation of the two CCD arrays. Also, in a further aspect, improved compression algorithms can be created folding the two images together, since the variances between the two will by typically less than 20 percent.

Figure 3:
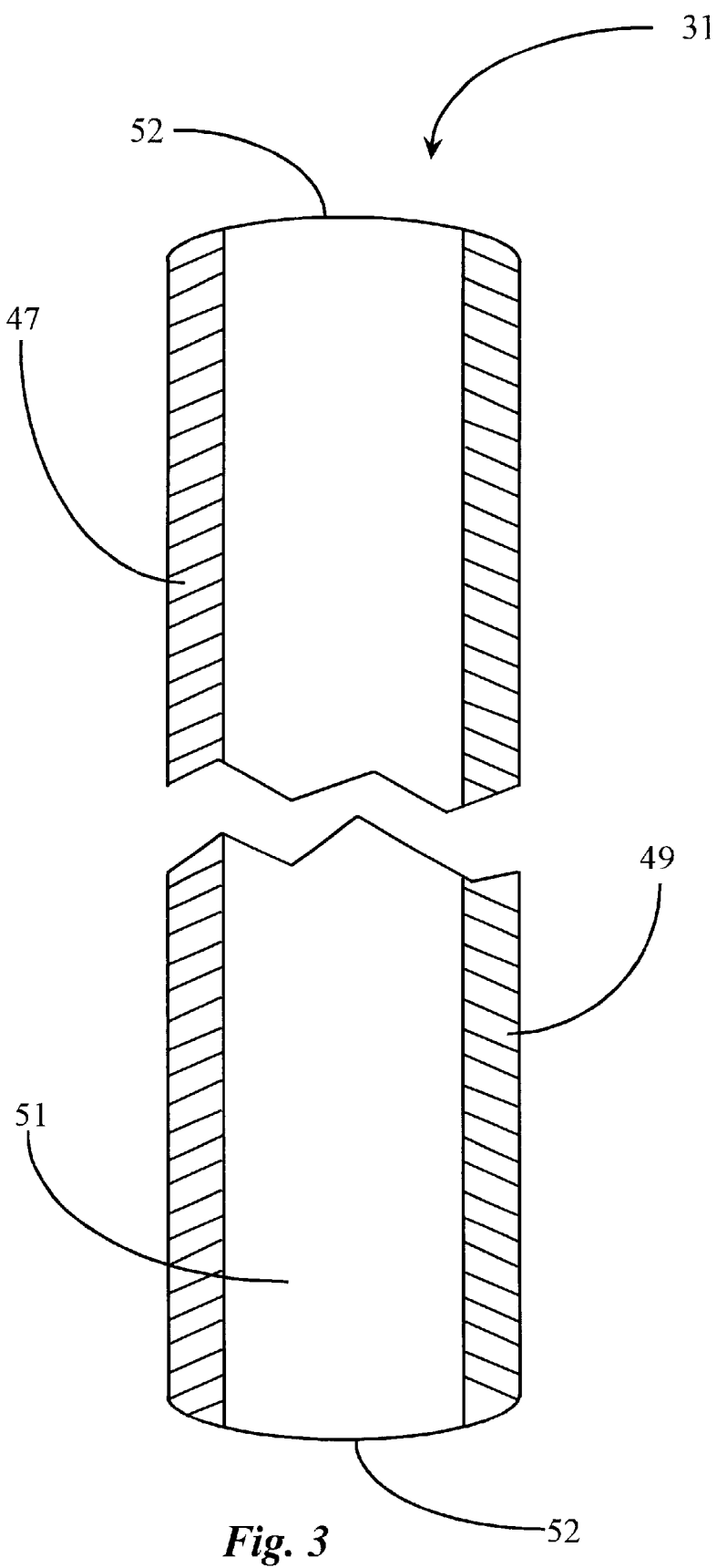
FIG. 3 is a side view of a section of the print medium of FIG. 1 according to an embodiment of the present invention.

FIG. 3 is an elevation view of a section of print medium 31 of FIG. 1 according to an embodiment of the present invention. In this embodiment print medium 31 is provided in the form of a unique gel-filled encapsulated paper comprising three distinct layers. An ink transmissive layer 47 is provided on one side of medium 31, and adapted to allow ink from an ink jet printer head to be drawn through it via an electrophoresis process that is explained in more detail below. Layer 47 may be of the form of a thin porous plastic. An electrophoretic gel layer 51 is provided and adapted as a porous filling immediately adjacent to layer 47. Gel-layer 51 is similar to gels that are known in art to be used in electrophoresis processes such as DNA fragment separation, such as agarose and polyacrylamide gels. A transparent layer 49 is provided as an ultra thin transparent backing to contain layer 51, and to provide a flat-plane viewing window for a topology to be created.

The three distinct layers described above are suitably sealed together around peripheral edges of the medium by a seal 52 which may be a simple plastic heat-seal or other known type of seal of which there are many. The porosity of layer 47 is such that ink may pass through but gel will be contained. The gel has a porosity such that ink, suitable ionic, may be drawn linearly therein to a predefined depth. Carrier layer 49 is not porous. The three layers taught above in a preferred embodiment measure approximately 1 micron in thickness when combined, with each outside layer measuring about 1/10 of a micron, although these dimensions may vary widely in different embodiments. Print medium 31, as constructed according to the embodiment taught herein, provides a means with which to accomplish topological printing based on calculated input data derived via algorithm from input CCD data files. Such a printed topology will produce a white-light-interference hologram when viewed from the carrier-layer side under white light.

In a preferred embodiment of the present invention ionic ink is printed in a dot-matrix protocol onto transmissive layer 47, and an electrophoresis process is used to draw ink from dots in the printed two-dimensional matrix into the gel to provide a 3-D interference topology when seen from the side of layer 47.

Figure 4:
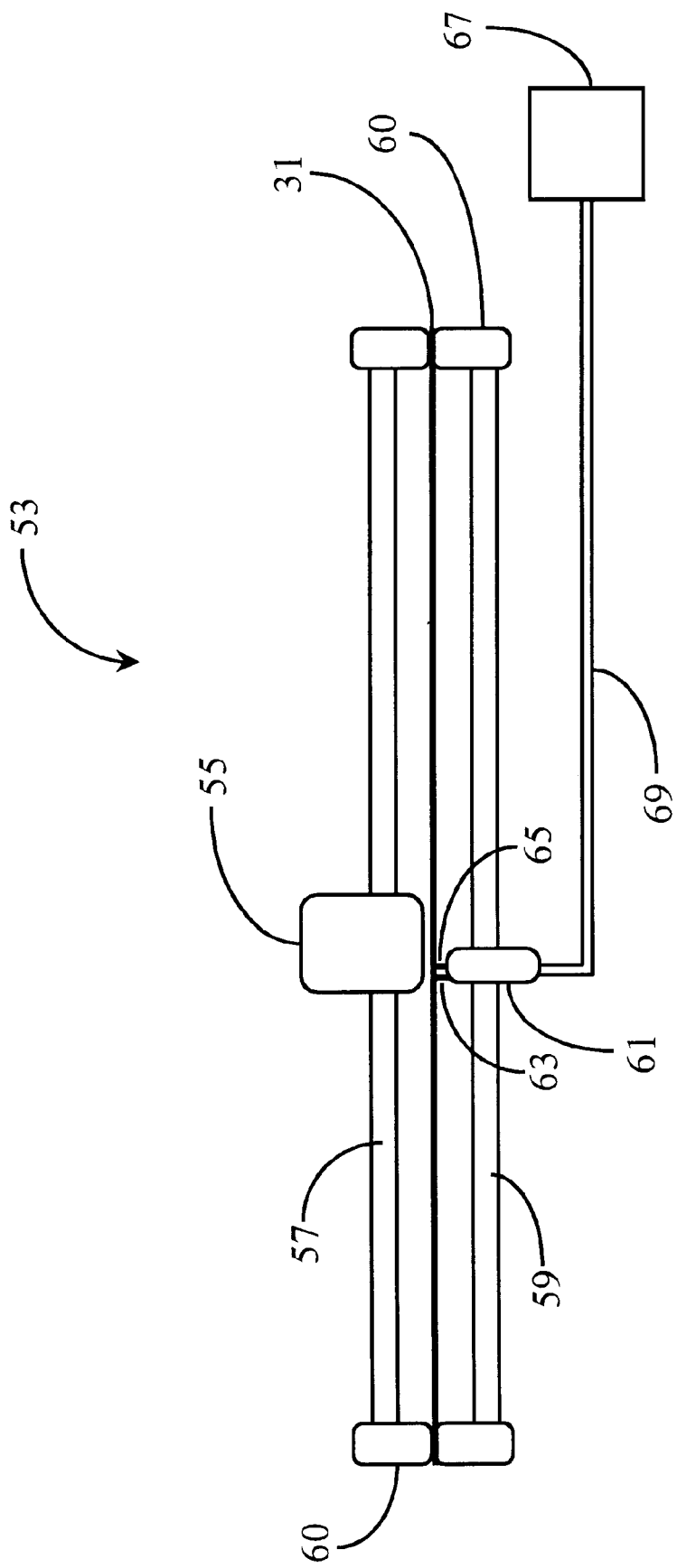
FIG. 4 is a block diagram of integral components of an electrophoresis-topological printer according to an embodiment of the present invention.

FIG. 4 is a block diagram of novel components and assemblies of an electrophoresis-topological printer according to an embodiment of the present invention. Because the method and apparatus of the present invention may be integrated with an ink-jet printer in terms of added hardware and modified printer function (software), essentially only those added components and altered elements are described.

A printer head 55 is provided according to an embodiment of the present invention to deliver 10 dots of ink that together comprise one vertical column of ink dots at one a time. By successively applying more columns of ink dots with each column adjacent to the previous column, a group of ten lines may be formed across printer medium 31 from left to right or from right to left. A second line of such 10-dot columns begins when printer head 55 returns to a beginning point and printer medium 31 is indexed for the next set of lines according to applicable printing protocol. Other printing orders may be observed, such as a different number of lines than ten, without departing from the spirit and scope of the present invention.

Printer head 55 is mounted to a printer carriage 57 such that it may travel the desired width of printer medium 31 during printing. Printer medium 31 is indexed between rollers 60 while printing is accomplished as is known in the art. There are four rollers 60 illustrated in this embodiment, however, in actual practice there may be several more as needed.

A second carriage 59 is provided to be substantially parallel to carriage 57, and print medium 31 passes between these carriages while traversing through the printer. A jacketed electrode-assembly 61 housing 10 independently-chargeable electrodes 65 is mounted to carriage 59 in a position wherein electrodes 65 assume a fixed collinear and vertical arrangement to the 10-dot ink-dispensing nozzle of printer head 55. The arraignment is in close proximity, allowing minimal space for printer medium 31 to pass through.

Electrode housing 61 also supports 10 insulated flash elements 63 rigidly affixed therein and arraigned adjacent to the array of electrodes 65 such that the space between the collinear arrays is equal to the space between successive columns of ink placed horizontally across printer medium 31. A multi-channel power supply 67 supplies variable magnitudes of electric voltage to individual electrodes 65 and additional power for operating flash elements 63. An electrical cable 69 with suitable individual lines connects power supply 67 to electrode housing 61 such that each electrode 65 may be individually powered. The power supply also supplies a separate common voltage and current to flash elements 63; that is, each flash element receives the same power.

Power supply 67 is controlled by the data received from PC 27 (FIG. 1) that drives the printing process. That is, rules governing the variable amounts of voltage applied to each electrode 65 during printing are derived from the supplied data, which is the "Z" axis data for the 3-D topology to be printed. In a preferred embodiment, variable voltages are applied to all 10 electrodes for a predetermined time at fixed intervals, the voltage being applied to each electrode at the time a dot of ink is applied to the printing medium, opposite the electrode. The ink is adapted to be translated under the influence of an electrical field, and the electrodes, together with a suitable means of charging (or grounding) the transmissive layer, provide the electromotive force to draw a column of ink from each printed dot into gel layer 51 of medium 31. The depth to which a dot of ink is translated into the gel is proportional to the magnitude of the voltage-time-product applied to the electrode for that dot of ink. In this way, a topology is printed according to parameters that will, when complete, produce a 3-D interference hologram viewable under white light.

As printer head 65 moves to print a second and adjacent 10-dot column, adjacent flash elements 63 operate to cure the first 10-dot column that has been drawn into gel-layer 51. This flash cure stabilizes ink columns such that they are not predisposed to migrate under influence of voltages applied to other columns or dots of ink. This cycle repeats across printer medium 31 as the printer head and the electrode head advance in unison. After printing, a separate curing operation (not shown) may be performed to more thoroughly cure the ink inside gel-layer 51.

It will be apparent to one with skill in the art that a method other than electrophoresis may be used to draw ink through a transmissive layer such as layer 47 without departing from the spirit and scope of the present invention. For example, by replacing each electrode 65 with an electromagnet that is adapted to provide a magnetic field for a dot of magnetic ink, and providing magnetic ink for the printing process, a result similar to electrophoresis may be achieved without substantial modification to the components already described. In this case, the flash-cure operation may remain the same.

According to yet another embodiment, a process for pre-drilling a printer medium via laser drilling may be used. In this case printer medium 31 has a layer 51 of a substance considerably more rigid than gel such as a transparent plastic retaining a certain amount of flexibility. During a preprinting process, a laser drill or drills are used to provide capillary openings to a depth based on Z-axis data for dots of ink to be later applied. During a next phase, printing is performed over the drilled topology such that the ink is drawn into the pre-drilled capillaries. This embodiment may also be aided via the use of magnets wherein the magnets urge the ink into the capillaries in an accelerated manner. The objective is to move the ink into a pre-conceived topology.

In yet another embodiment, two laser beams are combined, and at their crossing point, by the additive energy supplied by both beams, the gel might be rendered opaque. That may be achieved in different ways, both by molecular transformation of the gel, or by activating passive, suspended matter, that may react with itself or the gel.

Figure 5:
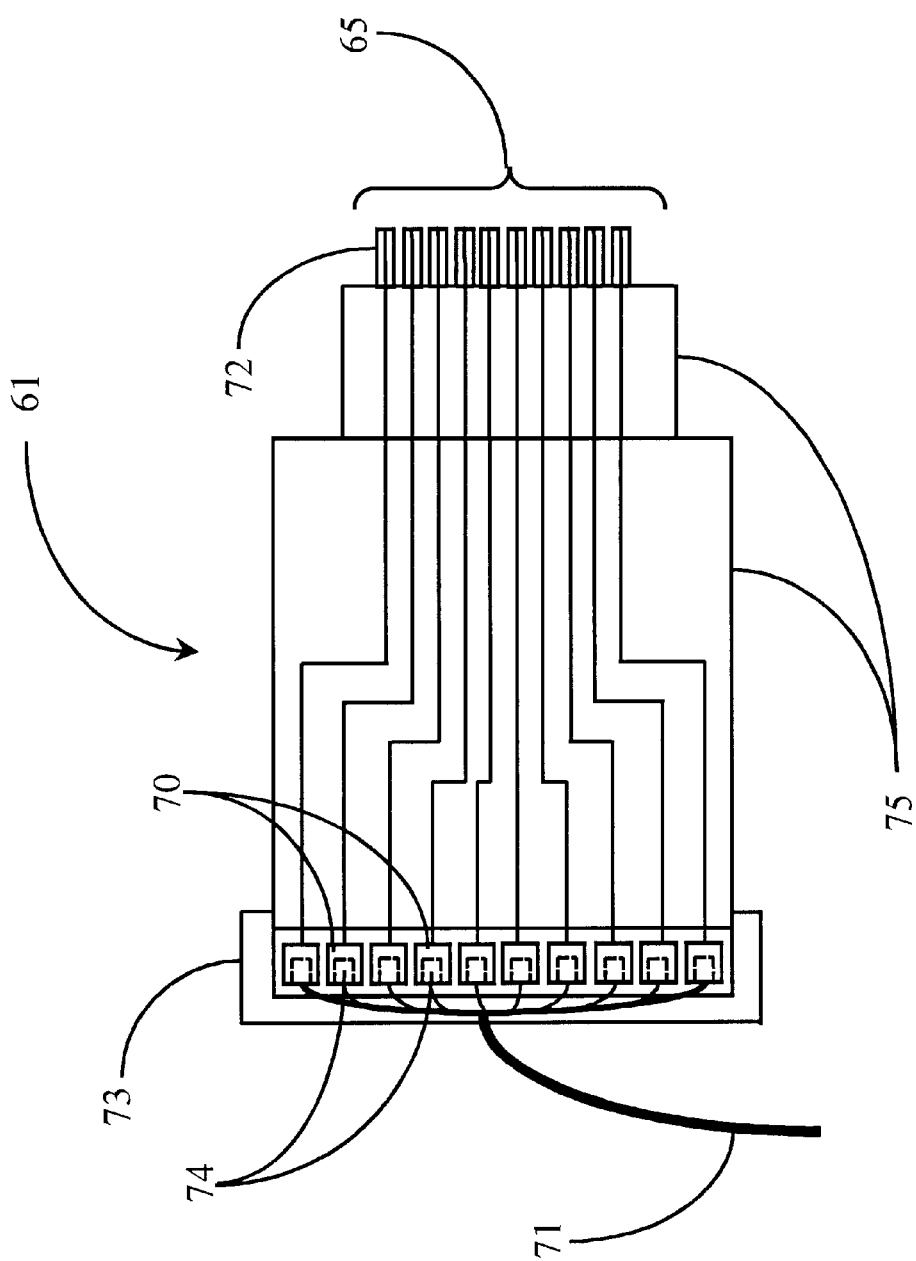
FIG. 5 is a plan view of the electrode mechanism of FIG. 4 according to an embodiment of the present invention.

FIG. 5 is a plan view of the electrode mechanism of FIG. 4 according to an embodiment of the present invention. As previously described with reference to FIG. 4, electrode mechanism 61 houses 10 individual electrodes 65 in a way that each may carry separate and variable voltages. The use of 10 such electrodes is merely representative as there may be, in actual practice, more or fewer such electrodes.

Each electrode 65 is insulated to avoid crosstalk during processing. A preferred method involves spraying the electrodes with a hardening insulator material 72, such as a heat-resistant plastic material, or a heated glass material that may cure thus forming the insulative barrier between electrodes 65. The ten electrodes may be encapsulated in the insulating material. It is noted here that a minimal space (flush) at the tip of each electrode is either left un-treated, or is subsequently etched away after treatment, to enable the electrode to function properly.

An insulating body 75 is provided and adapted to encapsulate the electrical connections leading to electrodes 65 such that they do not cross, or touch each other. The shape of body 75 may vary, it is desired however, to have a shape that accommodates other integral components (53, FIG. 4) which may be generic to a topological printer according to embodiments of the present invention.

At the end of body 75 opposite the operating electrodes, 10 conductive jackets 70 are arraigned and affixed to the encapsulated electrical connections leading to electrodes 65. Each conductive jacket 70 is adapted to enclose one conductive pin 74 of a collinear arrangement of such pins 74 presented in a plug 73. Plug 73 fits snugly over electrode mechanism 61 according to well known female to male relationship standards, such that an electrical connection is completed to all electrodes 65 in much the same way as with a pin connector. In this way, electrode mechanism 61 may be easily removed and replaced in the event of worn or broken electrodes or the like.

Figure 6:
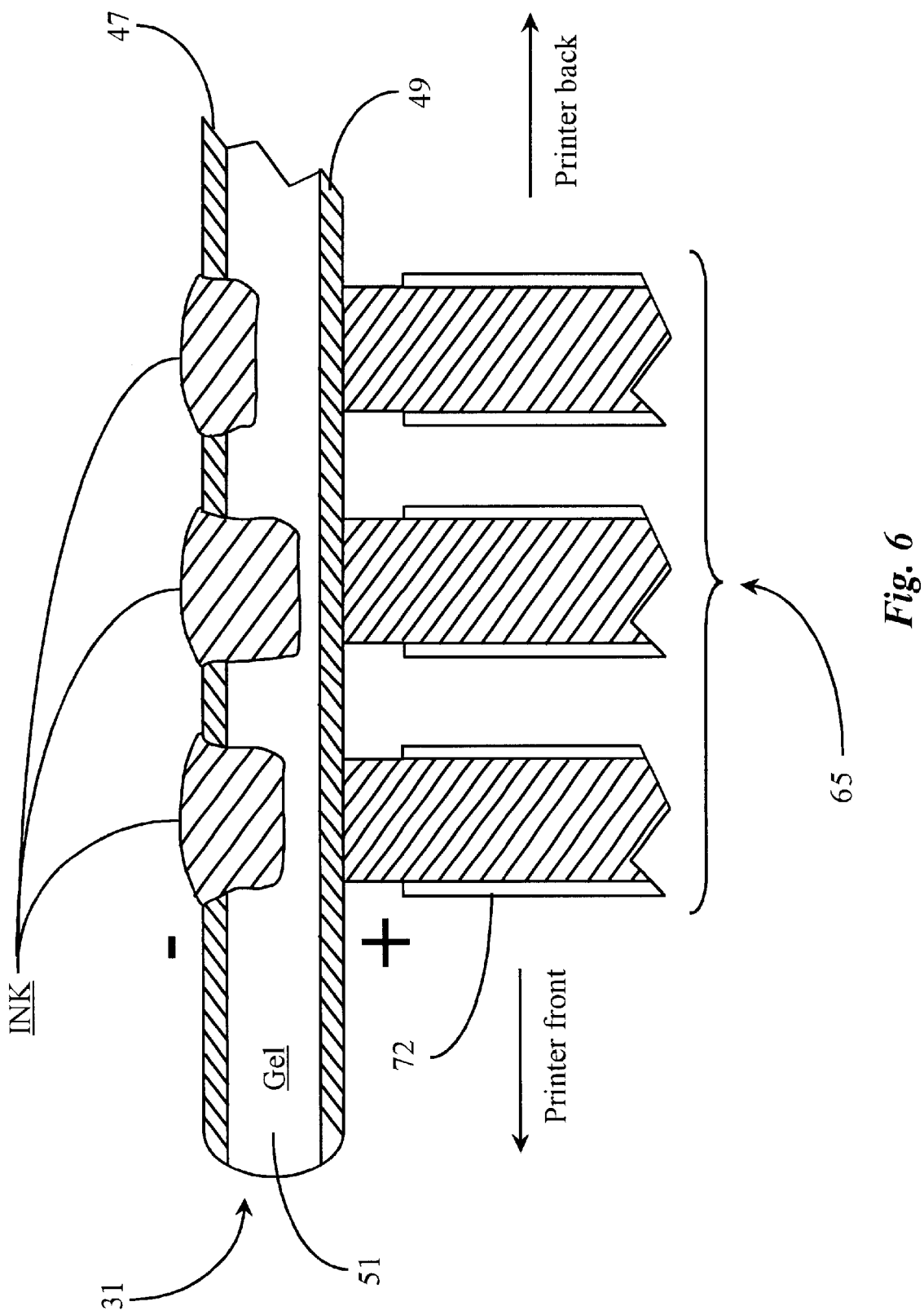
FIG. 6 is a demonstrative view of an electrophoresis cycle on one ink column according to an embodiment of the present invention.

FIG. 6 is an elevation view of the apparatus during a printing operation according to an embodiment of the present invention. As previously described with reference to FIG. 4, an electrophoresis process is used in a preferred embodiment of the present invention for creating an interference topology Printer medium 31 by virtue of the porosity of tranmissive-layer 47 allows the ink to pass through to gel-layer 51. The ink is urged into gel-layer 51 via an electrical field unique to each applied ink dot by electrodes 65. Layer 49 acts as a barrier such that ink drawn the entire depth of gel-layer 51 is contained, and the gel interior is protected. In a preferred embodiment, the maximum depth in which ink may be drawn into gel-layer 51 is just short of the total thickness of the medium. This insures that no spread of ink will occur on the back layer which is the viewing widow for the white light 3-D image created.

Although the resulting 3-D image may not be transferable from printer medium 31 to another medium, such a paper, the image may be scanned into a PC and transmitted over a network to another location for reprinting. Printer medium 31 may assume any size as is typical in printing operations.

After topological printing, a cure operation may be performed as previously described to harden gel-layer 51 into a semi-flexible form for handling or otherwise fixate the ink and stop it from moving. In the case of pre-print laser drilling as previously described, curing might not be required. According to various embodiments of the present invention, the topological printing operation may be performed via a modified ink-jet printer or a new ink-jet printer adapted specifically for the purpose.

In some cases the electrode may be a two dimensional array behind the printing medium, or it may be a single row, parallel or perpendicular to the motion of the head. In some cases toner systems as known in laser printers may be used, and by accumulating different amounts of toners, it can be piled and then "pushed" into the gel.

Figure 7:
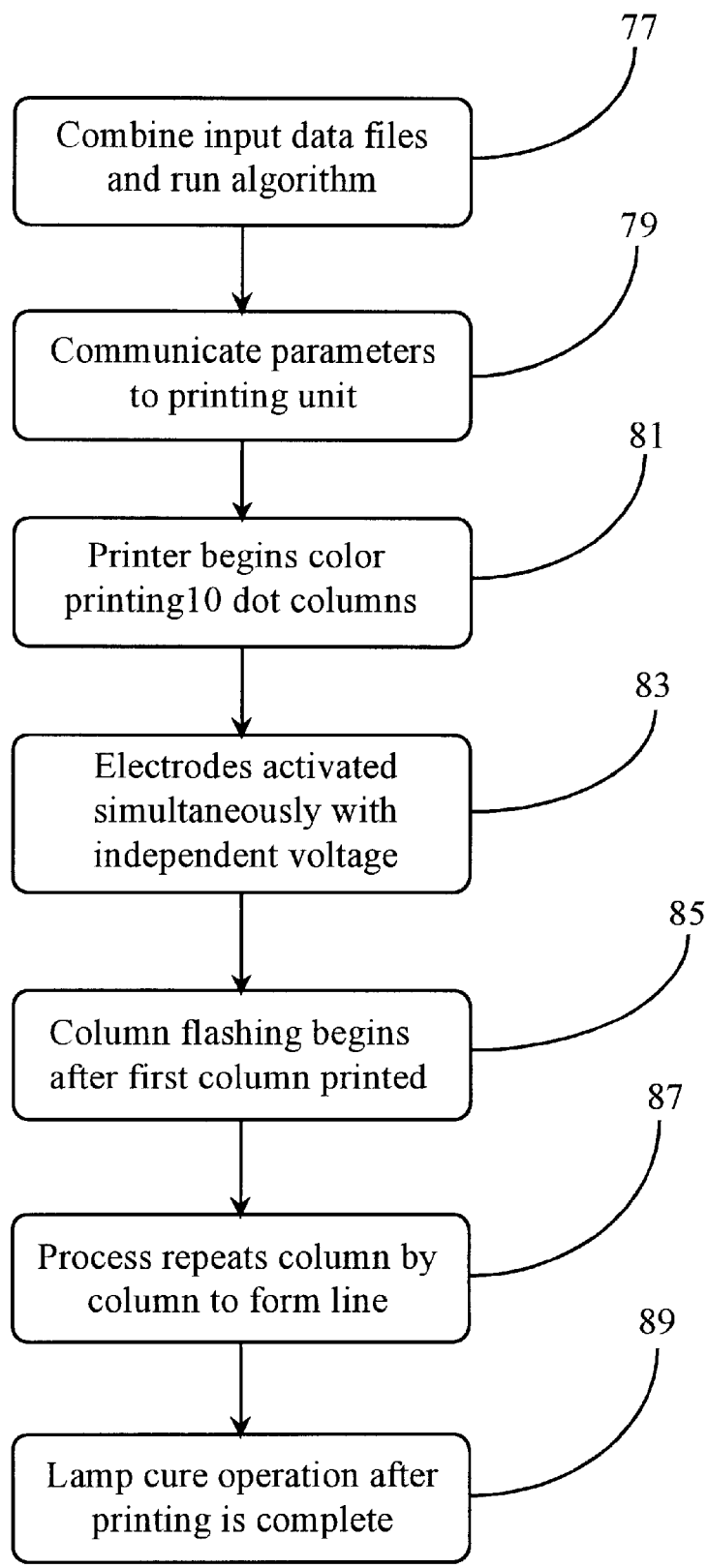
FIG. 7 is a flow diagram illustrating the electrophoresis printing process according to an embodiment of the present invention.

FIG. 7 is a flow diagram illustrating the data capturing and 3-D topology printing process according to an embodiment of the present invention. An exemplary process-flow diagram presented herein as FIG. 7 is meant only to provide one example of a basic topology printing process according to an embodiment of the present invention.

At step 77, computing software on a PC such as PC 27 of FIG. 1 combines CCD input data from a 3-D digital camera such as camera 13 of FIG. 1 and performs algorithmic calculations in order to obtain printing data.

At step 79, the printing instructions are communicated to a printing unit adapted to print according to an embodiment of the present invention. Such communication may take place over a suitable printer cable such as cable 32 (FIG. 1), or perhaps via a wireless mode.

At step 81, the printing unit begins to starts the first column, in the exemplary case a 10-dot column, which will be the first such column in a series of horizontally-printed lines. It should be noted here that in addition to topological printing, text and flat images may still be printed by excluding use of electrodes 65 during such printing.

At step 83 electrodes are activated at time a column of ink dots is applied so as to draw the separate ink dots to specified depths into the gel layer. In a preferred embodiment, the electrodes are activated simultaneously for a fixed period of time, but will carry provide different voltages as may be required to urge the ink to varying specified depths. This simplifies timing requirements and allows for flash curing to be performed more effectively.

At step 85, column curing begins on a first 10-dot column at the same time that the next 10-dot column is being applied. The flash elements (63 of FIG. 4) are collinear to electrodes 65 and are positioned in an adjacent array such that the space between both arrays is equal to the space between 10-dot columns.

The above steps represent a cycle that is repeated in step 87 until printing is complete. As an option, step 89 provides a lamp curing operation after printing is complete. Such an operation may be performed on a separate piece of hardware such as a scanner type bed fitted with a heat lamp.

It will be apparent to one with skill in the art that the method and apparatus of the present invention may be used for creating white light interference holograms of any printable size. It will also be apparent to one with skill in the art that other processes may be used instead of electrophoresis such as magnetic or laser drilling and printing methods.

It will further be apparent to one with skill in the art that individual components described herein such as electrodes, flash-electrodes, encapsulated electrode jackets, printer head nozzles, curing lamps, etc., may be provided in forms other than the forms described herein without departing from the spirit and scope of the present invention. For example, instead of a protruding electrode mechanism, an array of electrodes may be presented in a movable plate adapted to move with the printer head. The printer head may have removable printing nozzles having a varying number of openings allowing for different size ink columns. Depending on the application and materials used, flash elements such as elements 63 of FIG. 4 may or may not be required, and so on. Therefore, the present invention as taught and described in enabling detail above should be afforded the broadest scope. The spirit and scope of the present invention is limited only by the claims that follow.

What is claimed is:

1. A system for producing a white-light interference hologram, comprising:
    a camera adapted for recording a first and a second bitmap image of a scene from separate vantage points, and the separation distance of the vantage points;
    a computing engine adapted to compute three-dimensional x, y, and z characteristics of an interference hologram topology for the scene from the bitmap images and separation data, wherein x and y are two dimensional locations of bits in a bitmap of the topology and z is a depth dimension for each x,y bit; and
    a printer adapted to print in color the x,y bitmap of the topology, and to create the depth dimension z at each x,y bit location, providing thereby a three-dimensional interference hologram topology for the scene.

* * * * *